United States Patent
Dag et al.

(10) Patent No.: US 12,552,589 B2
(45) Date of Patent: *Feb. 17, 2026

(54) BIODEGRADABLE PULP PACKAGING PRODUCTS FROM NATURAL FIBERS

(71) Applicant: PAPACKS SALES GMBH, Cologne (DE)

(72) Inventors: Tahsin Dag, Cologne (DE); Michael Marchuk, Cologne (DE); Ahmet Dag, Cologne (DE)

(73) Assignee: PAPACKS SALES GMBH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/219,296

(22) Filed: May 27, 2025

(65) Prior Publication Data
US 2026/0015144 A1 Jan. 15, 2026

Related U.S. Application Data

(63) Continuation of application No. 19/063,947, filed on Feb. 26, 2025, now Pat. No. 12,338,048, which is a
(Continued)

(51) Int. Cl.
*B65D 65/46* (2006.01)
*B65D 65/42* (2006.01)
(Continued)

(52) U.S. Cl.
CPC .......... *B65D 65/466* (2013.01); *B65D 65/42* (2013.01); *D21H 11/12* (2013.01); *D21H 11/18* (2013.01);
(Continued)

(58) Field of Classification Search
None
See application file for complete search history.

(56) References Cited

U.S. PATENT DOCUMENTS

| | | | |
|---|---|---|---|
| 6,379,594 | B1 | 4/2002 | Dopfner et al. |
| 11,524,921 | B2 | 12/2022 | Moolman et al. |

(Continued)

FOREIGN PATENT DOCUMENTS

| | | | |
|---|---|---|---|
| CN | 103114339 A | | 5/2013 |
| EP | 0877646 A2 | | 11/1998 |

(Continued)

OTHER PUBLICATIONS

International Search Report PCTEP2025068797 dated Sep. 23, 2025.
(Continued)

*Primary Examiner* — James C Yager
(74) *Attorney, Agent, or Firm* — NEO IP

(57) ABSTRACT

A molded pulp product formed from the molding of a three-dimensional pulp slurry. The pulp slurry comprises a natural fiber composition of virgin fibers which have not been recycled and are derived from plant materials. The natural fiber composition includes hemp fibers which have been micronized to suitable length and combined with pulverized hemp shive to form a fibrous matrix. The molded pulp product is formed from a vacuum molding process, thermoforming process, custom air-burst molding process, or other molding process wherein the slurry is applied to a three-dimensional mold and a three-dimensional product is formed. The resulting packaging product is one hundred percent biodegradable.

20 Claims, 9 Drawing Sheets

402

Related U.S. Application Data continuation of application No. 18/771,411, filed on Jul. 12, 2024, now Pat. No. 12,246,897.

(51) Int. Cl.
*D21H 11/12* (2006.01)
*D21H 11/18* (2006.01)
*D21J 1/08* (2006.01)
*D21J 3/10* (2006.01)

(52) U.S. Cl.
CPC . *D21J 1/08* (2013.01); *D21J 3/10* (2013.01); Y10T 428/1348 (2015.01)

(56) References Cited

U.S. PATENT DOCUMENTS

| | | |
|---|---|---|
| 2016/0325288 A1 | 11/2016 | Bates |
| 2021/0254285 A1 | 8/2021 | Chen et al. |
| 2022/0097936 A1 | 3/2022 | Aufoujal et al. |
| 2022/0162801 A1 | 5/2022 | Zhu |
| 2023/0022793 A1 | 1/2023 | Kohn |
| 2023/0027593 A1 | 1/2023 | Kohn |
| 2023/0062079 A1 | 3/2023 | Fini et al. |
| 2023/0249890 A1 | 8/2023 | Törnblom et al. |

FOREIGN PATENT DOCUMENTS

| | | |
|---|---|---|
| WO | 2022140857 A1 | 7/2022 |
| WO | 2022271587 A1 | 12/2022 |

OTHER PUBLICATIONS

Yimlamai, Piyawan & Ardsamang, Theerat & Puthson, Pratuang & Somboon, Phichit & Puangsin, Buapan. (2023). Soda Pulping of Sunn Hemp (*Crotalaria juncea* L.) and Its Usage in Molded Pulp Packaging. Journal of Bioresources and Bioproducts. 8.10.1016/j.jobab.2023.04.003.

BIODEGRADABLE PULP PACKAGING PRODUCTS FROM NATURAL FIBERS

CROSS REFERENCE TO RELATED APPLICATIONS

This application is related to and claims priority from the following U.S. patents and patent applications. This application is a continuation of U.S. application Ser. No. 19/063,947, filed Feb. 26, 2025, which is a continuation of U.S. application Ser. No. 18/771,411, filed on Jul. 12, 2024, each of which is incorporated herein by reference in its entirety.

BACKGROUND OF THE INVENTION

1. Field of the Invention

The present invention relates to biodegradable packaging products, and more specifically to biodegradable packaging products created by molding three-dimensional pulp including natural fibers.

2. Description of the Prior Art

It is generally known in the prior art to provide biodegradable packaging products from natural fibers.

Prior art patent documents include the following:

US Patent Pub. No. 2022/0162801 for Natural fiber composites as a low-cost plastic alternative by inventor Zhu, filed Nov. 19, 2021 and published May 26, 2022, is directed to mixed pulp compositions comprising a short fiber plant pulp (e.g., sugar cane bagasse) and a long fiber plant pulp (e.g. bamboo fiber). Also provided is a process for preparing the compositions.

US Patent Pub. No. 2022/0097936 for Biodegradable food articles and methods of producing same by inventors Aufoujal et al., filed Sep. 29, 2021 and published Mar. 31, 2022, is directed to a method for producing biodegradable food articles. The method comprises providing raw fibers; reducing the size of the raw fibers; mixing the fibers with a liquid to obtain a slurry; mixing at least one additive to the slurry, and thermoforming the slurry to obtain the biodegradable food article. Also provided are biodegradable food articles and in particular biodegradable food trays produced according to the method disclosed.

US Patent Pub. No. 2023/0062079 for Hemp composites by inventors Fini et al., filed Aug. 25, 2022 and published Mar. 2, 2023, is directed to a hemp composite including hemp, paper, and oil. Making a hemp composite includes processing hemp to yield a processed hemp. The processed hemp includes water. Making a hemp composite further includes combining the processed hemp with paper and oil to yield a hemp mixture, removing at least some of the water from the hemp mixture, and drying the hemp mixture to yield the hemp composite.

US Patent Pub. No. 2023/0027593 for Hemp paper sleeves and other devices made from hemp for holding cups by inventor Kohn, filed Jul. 21, 2022 and published Jan. 26, 2023, is directed to the use of hemp paper for use to manufacture paper sleeves paper sleeves and other devices made from hemp for holding cups.

US Patent Pub. No. 2023/0249890 for a 3d shaped packaging product from an air-laid blank by inventors Törnblom et al., filed Jan. 6, 2023 and published Aug. 10, 2023, is directed to a 3D shaped packaging product for cushioning and/or thermal insulation of packaged goods formed by hot pressing at an average pressure equal to or below 200 kPa of an air-laid blank comprising natural fibers at a concentration of at least 70% by weight of the air-laid blank and a thermoplastic polymer binder at a concentration selected within an interval of from 4 up to 30% by weight of the air-laid blank. The 3D shaped packaging product has a density that is less than four times a density of the air-laid blank and the density of the 3D shaped packaging product is selected within an interval of from 15 to 240 kg/m3. The 3D shaped packaging product maintains at least a significant portion of the porosity of the air-laid blank even after hot pressing and therefore provides excellent shock absorbing and damping properties and thermal insulation.

US Patent Pub. No. 2021/0254285 for Cellulose materials and methods of making and using the same by inventors Chen et al., filed Apr. 26, 2021 and published Aug. 19, 2021, is directed to materials such as cellulose based materials and composite materials. Also provided are methods for making or using the materials.

U.S. Pat. No. 6,379,594 for Process for producing workpieces and molded pieces out of cellulose and/or cellulose-containing fiber material by inventors Döpfner et al., filed Jul. 22, 1998 and issued Apr. 30, 2002, is directed to a process for producing a work piece including providing raw material which is cellulose-containing and fibrous, which is not any part of a tree, and which is selected from the group consisting of, crude plant fibers, pure cellulose, waste paper, and waste cardboard; adding water to the raw material; finely chopping the raw material in a machine by continuously grinding the raw material with a total energy expenditure of at least 0.5 kWh/kg, based on dry weight of the raw material, into a microfiber pulp having an increased internal fiber surface and an increased degree of interlinking; forming the microfiber pulp to provide a shaped green body; and drying the shaped green body by removing water therefrom to harden the shaped green body and form a work piece, wherein the shaped green body is hardened into the work piece by drying only without admixture of bonding agents to the microfiber pulp and without use of external pressure, and wherein the work piece has characteristics which depend on degree of grinding to produce the microfiber pulp and which range from (a) paper carton-like to (b) wood-like to (c) horn-like, the work piece having a specific gravity which ranges up to that of pure cellulose, 1.5.

Chinese Patent No. 103,114,339 for Preparation method of hemp stalk viscose fiber and application thereof, filed Mar. 18, 2013 and granted Apr. 15, 2015, is directed to a preparation method of hemp stalk viscose fiber and the application of the hemp stalk viscose fiber to paper diapers. The preparation method comprises steps of material preparation, dipping pressing, crushing, ageing, sulphidizing, dissolving, filtering, debubbling, filtering before spinning, wire drawing, post treatment and the like, is simple in preparation technology, and saves cost. The method adopts hemp stalk viscose fiber extracted from hemp stalk to prepare paper diapers which have the functions of bacteria prevention, mould proof, air permeability, comfort characteristic, heat emission and radiation hardening which are characteristics of original ecology, so that compared with the prior art adopting organic and inorganic bacteria prevention, the hemp stalk viscose fiber has better bacteria prevention effect, is laundry-resistant and easy to degrade, and can be continuously utilized.

U.S. Pat. No. 11,524,921 for Composite materials containing hemp and nanocellulose by inventors Moolman et al., filed Feb. 12, 2019 and issued Dec. 13, 2022, is directed to a new composite material comprising nanocellulose and hemp or a hemp-derived component, such as pure hemp, hemp bast fibers, hemp inner fibers, hemp shives, hemp leaves, hemp seeds, or ground hemp. The nanocellulose may be hydrophobic or hydrophilic, and may include cellulose nanocrystals, cellulose nanofibrils, cellulose microfibrils, or a combination thereof. This invention provides construction blocks or panels; engineered parts; fire-resistant objects; coatings; containers; textile compositions; and fabric materials, for example. The composite material may also include one or more additives to modify mechanical, thermal, chemical, and/or electrical properties. The addition of nanocellulose can improve the mechanical properties of hemp-containing concrete mixtures to improve compressive strength for construction purposes.

US Patent Pub. No. 2023/0022793 for Hemp paper bags by inventor Kohn, filed Jun. 30, 2022 and published Jan. 26, 2023, is directed the use of hemp paper for use in bags or newsprint.

SUMMARY OF THE INVENTION

The present invention relates to a biodegradable packaging product formed from molding a three-dimensional (3D) fiber pulp slurry. The pulp slurry is created from a composition of virgin natural fibers mixed with a liquid to create a 3D pulp slurry.

It is an object of this invention to provide a durable, biodegradable packaging product for storage, transport, and distribution of a variety of products, including cosmetics, foodstuffs, and pharmaceutical products. The packaging is made from virgin fibers to prevent chemical contamination of contents which are packaged within the molded pulp product of the present invention. The packaging product is also made from a composition of natural fibers (i.e., hemp, sweetgrass, wood) to create a sustainable, fully biodegradable product.

In one embodiment, the present invention a biodegradable packaging product, including a plurality of sides and a cavity, wherein the plurality of sides form a unitary body, wherein the plurality of sides are comprised of natural fibers, wherein the natural fibers are virgin fibers which have not been recycled, wherein the natural fibers are comprised of a mixture of mechanically micronized hemp fibers and pulverized hemp shive, and wherein the mechanically micronized hemp fibers include long fibers and short fibers.

In another embodiment, the present invention includes a biodegradable packaging product, including a matrix of natural fibers, wherein the natural fibers are virgin fibers, wherein the natural fibers are comprised of mechanically micronized hemp fibers and pulverized hemp shive, wherein the mechanically micronized hemp fibers include long fibers and short fibers, wherein the matrix of natural fibers is formed from a fiber pulp slurry, wherein the fiber pulp slurry is applied to a mold, and wherein the fiber pulp slurry is dried directly in the mold.

In yet another embodiment, the present invention includes a biodegradable packaging product, including an object molded from a fiber pulp slurry, and a biodegradable coating, wherein the fiber pulp slurry is comprised of natural fibers and a liquid, wherein the natural fibers are comprised of mechanically micronized hemp fibers and pulverized hemp shive, wherein the mechanically micronized hemp fibers include long fibers and short fibers, wherein the fiber pulp slurry is applied to a mold and is dried, and wherein as the fiber pulp slurry dries, the object is pressed only once.

These and other aspects of the present invention will become apparent to those skilled in the art after a reading of the following description of the preferred embodiment when considered with the drawings, as they support the claimed invention.

DETAILED DESCRIPTION

Figure 1:
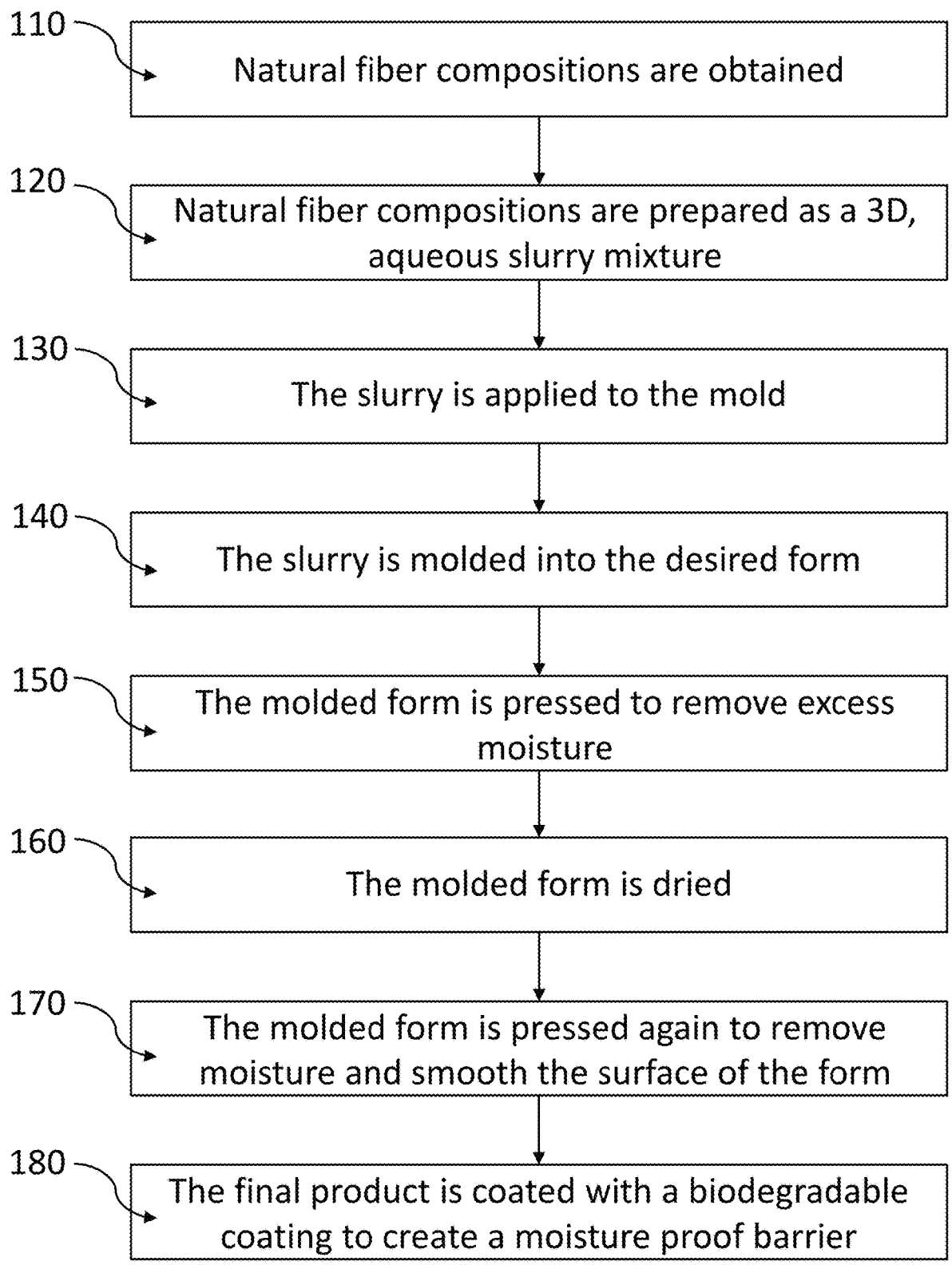
FIG. 1 is a process flow diagram illustrating the method of forming the product of the present invention according to one embodiment of the present invention.

The present invention is generally directed to a biodegradable packaging product formed from molding a three-dimensional (3D) fiber pulp slurry. The 3D pulp slurry is created from a composition of virgin natural fibers mixed with a liquid.

In one embodiment, the present invention includes a biodegradable packaging product, including a plurality of sides and a cavity, wherein the plurality of sides form a unitary body, wherein the plurality of sides are comprised of natural fibers, wherein the natural fibers are virgin fibers which have not been recycled, wherein the natural fibers are comprised of a mixture of mechanically micronized hemp fibers and pulverized hemp shive, and wherein the mechanically micronized hemp fibers include long fibers and short fibers.

In another embodiment, the present invention includes a biodegradable packaging product, including a matrix of natural fibers, wherein the natural fibers are virgin fibers, wherein the natural fibers are comprised of mechanically micronized hemp fibers and pulverized hemp shive, wherein the mechanically micronized hemp fibers include long fibers and short fibers, wherein the matrix of natural fibers is formed from a fiber pulp slurry, wherein the fiber pulp slurry is applied to a mold, and wherein the fiber pulp slurry is dried directly in the mold.

In yet another embodiment, the present invention includes a biodegradable packaging product, including an object molded from a fiber pulp slurry, and a biodegradable coating, wherein the fiber pulp slurry is comprised of natural fibers and a liquid, wherein the natural fibers are comprised of mechanically micronized hemp fibers and pulverized hemp shive, wherein the mechanically micronized hemp fibers include long fibers and short fibers, wherein the fiber pulp slurry is applied to a mold and is dried, and wherein as the fiber pulp slurry dries, the object is pressed only once.

None of the prior art discloses a fibrous matrix including mechanically micronized hemp fibers of two distinct lengths (i.e., a first, longer length and a second, shorter length) and pulverized hemp shive particulates, in a fibrous matrix for creating a 3D pulp slurry for molding natural fiber based products. Additionally, none of the prior art discloses such a slurry that contains no additives (e.g., fillers, binding agents, water-proofing agents) to the pulp slurry.

Plastic has long been the primary packaging product for many companies over the past century. Products made from plastic are durable, water impermeable, and cheap to mass produce, making plastic and similar materials the most popular choice for packaging. However, plastic is nondegradable and requires a time-consuming, expensive, and highly specialized process to reduce the plastic into reusable components. As a result, plastic products accumulate in the oceans and in landfills all over the world. Since the dangers of plastic waste were first brought to the attention of the public in 1960, the use of plastic and similar nondegradable products has only increased. With nearly 200 million estimated tons of plastic in the oceans and an additional 33 billion pounds of plastic added per year, biodegradable packaging has become an area of increasing focus over the past decade.

Natural fibers, and specifically hemp fibers, have proven over the course of history to form durable compositions. Paper fragments made from hemp dating back to as early as 179 BCE have been recovered from archeological sites, and the scientific community has attributed this longevity, in part, to the use of hemp fiber in the composition of the paper fragments. Hemp remains one of the strongest natural fibers, due to the chemical composition of the plant as well as the mechanical structure of the fibrous layers. In the search for a durable plastic alternative, the use of hemp fibers in a composition will provide significant durability. In addition, hemp is a sustainable crop, requiring no pesticides during cultivation. The entire hemp plant can be broken down, harvested, and used in a variety of application such as building materials, textile formation, and papermaking, so no waste is produced.

The present invention incorporates these durable hemp fibers into a specific fiber composition of micronized hemp fibers. These hemp fibers are incorporated with pulverized hemp shive to form a dense matrix which enhances water impermeability and strengthens the three-dimensional molded forms resulting from the molding process disclosed herein. Three-dimensional pulp slurries formed from the natural fiber composition are operable to be produced quickly and implemented into a product molding assembly line. This allows for bulk production of biodegradable packaging materials in order to meet the high demand for packaging products and reduce the incentive to use readily available plastic packaging.

Some prior art compounds attempt to incorporate hemp fibers with plastic or other non-biodegradable particulates to create a partially biodegradable packaging product. However, this approach does not create a fully biodegradable packaging product and only encourages the continued use of plastics. Other prior art attempts to create natural plant based packaging material using fibers of various lengths. However, the long fibers are derived from a first plant and the short fibers are derived from a second plant. This may create instability in a fibrous matrix due to fibers of different lengths having different properties.

Additionally, some prior art attempts to decrease the length of natural fibers prior to pulp slurry formation using chemical means. The use of chemicals in these products both weakens the natural fiber and therefore the resulting products and introduces chemicals into the packaging product which may prevent the resulting product from being safe for food-grade, pharmaceutical, and cosmetic packaging. In the same way, some prior art discloses the use of additives in the formation of the pulp slurry of the present invention. The use of such additives may also impact the food safe properties of any resulting product while chemically degrading the natural fibers and thereby reducing the durability of the resulting product.

Thus, there is a long-felt unmet need for a biodegradable packaging alternative which is impermeable to water, fully biodegradable, does not include performance additives, and incorporates a micronized matrix of both long and short fibers of a single natural plant type. The packaging product of the present invention is fully biodegradable and utilizes a fibrous matrix of hemp fibers of varying lengths including hemp fibers and hemp shive particulates in order to create a sustainable alternative to plastic that is impermeable to liquids and operable to be mass produced. Additionally, the present invention provides a biodegradable packaging material that includes a natural fiber composition including both long and short fibers from a single fiber source (i.e., hemp). This ensures that both the long and short fibers have identical properties and quality and prevents the collapse of a product created from the natural fiber composition. Further, the present invention uses only natural fibers which have undergone a solely mechanical process to obtain micronized fibers for use in the natural fiber composition of the present invention. Further still, the pulp slurry of the present invention is additive free, including only water and the natural fiber to create the three dimensional pulp slurry. Thus, the present invention meets this long-felt unmet need where prior art fails.

Referring now to the drawings in general, the illustrations are for the purpose of describing one or more preferred embodiments of the invention and are not intended to limit the invention thereto.

FIG. 1 is a process flow diagram illustrating the method of forming a molded pulp product according to one embodiment of the present invention. At step 110, a natural fiber composition is obtained. At step 120, the composition is prepared as a 3D, aqueous slurry mixture. At step 130, the slurry is applied to one or more molds. At step 140, the slurry is molded into the desired form using a molding process (e.g., thermoforming). At step 150, the resulting molded form is pressed to rid the form of excess moisture before the product is dried at step 160. At step 170, the mold is pressed again. At step 180, the twice pressed molded form is coated with a biodegradable coating mixture. The steps of this process are further described herein.

One of ordinary skill in the art will appreciate that one or more of these steps may be omitted or reorganized without deviating from the disclosure of the present invention. In one embodiment, the product of the present invention is pressed during the molding process to produce a three-dimensional product and no subsequent pressing is required. In one embodiment, the product of the present invention is pressed only once after the form is molded. In one embodiment, the product of the present invention is not coated after the form is pressed. In one embodiment, the product of the present invention is pressed only once after the molded form is dried. In one embodiment, the product is pressed after molding to obtain a desired surface quality, create one or more decorative elements (e.g., embossing), seal one or more coating layers, or apply a removable seal to the product.

The natural fiber compositions of the present invention provide for biodegradability of resulting molded products. The present invention is operable to use a pure composition of a single natural fiber composition or a combination of two or more natural fiber compositions. Examples of natural fibers include but are not limited to hemp, sweetgrass, jute, flax, bast fibers, straw, miscanthus, eucalyptus, cotton, and wood. The natural fiber composition of the present invention is not used in an air-laid process. Rather, the composition is mixed with a liquid to form a slurry.

In one embodiment of the present invention, the natural fiber composition is a hemp composition. Hemp has many inherent qualities that are advantageous in packaging. Industrial hemp has natural antimicrobial properties due to the cannabinoids and alkaloids found within the plant. Additionally, hemp is naturally resistant to UV light, as well as mold and mildew. Further, hemp is one of the most durable natural fibers due to the plurality of lignocellulosic layers within each fiber.

One of ordinary skill in the art will appreciate that industrial hemp must undergo decortication in order to separate the hemp fiber from the woody shive (also referred to herein as the hurd) of the industrial hemp plant. Byproducts of such a decortication process include hemp dust particles and hemp shive. The present invention utilizes hemp fibers resulting from a mechanical hemp decortication process. In one embodiment, the hemp fibers are retted prior to decortication to remove lignin, which binds the fibers and the shive. In one embodiment, the hemp plants from which the hemp fibers of the present composition are derived are retted to a moisture content that is between about 10% to about 15% of the initial moisture content of the plants. In one embodiment, the hemp plants are dried to a moisture content that is about 12%. In one embodiment, the hemp fibers obtained after decortication are between about 95% to about 100% pure (i.e., containing less than about 5% industrial hemp byproducts by weight, or containing no industrial hemp byproducts). In one embodiment, the hemp fibers obtained after decortication are about 98% pure (i.e., containing less than 2% industrial hemp byproducts by weight).

Natural fibers (i.e., any natural fibers, not only hemp fibers) which are too long may create clogs in the molding process that prevent efficient production, requiring cleaning of the mold, vats of pulp slurry, piping used to transport the pulp slurry, and other machinery. Additionally, natural fibers which are too long may impact the quality of the molded product resulting from the process of the present invention. In one embodiment, the hemp composition of the present invention includes hemp fibers which have been micronized. Micronization of the fibers includes shredding the hemp fibers to obtain fibers of a length suitable for dissolution in an aqueous solution (e.g., water) and subsequent molding. In one embodiment of the present invention, the hemp composition includes micronized hemp fibers. In one embodiment of the present invention, the hemp fiber is exclusively mechanically micronized. In one embodiment, the composition of the present invention does not include hemp fibers which have been chemically micronized. Chemical micronization may weaken the hemp fibers and affect the chemical purity of the hemp fibers. Therefore, it is an advantage of the present invention to use only mechanically micronized fibers.

In one embodiment of the present invention, the hemp composition includes both long hemp fibers and short hemp fibers. In one embodiment, the ratio of long hemp fibers to short hemp fibers in the hemp composition is operable to be 1:1, 1:2, 1:3, 1:4, 1:5, 2:1, 2:3, 2:5, 3:1, 3:2, 3:4, 3:5, 4:1, 4:3, 4:5, 5:1, 5:2, 5:3, or 5:4. In one embodiment, the hemp composition comprises about 50% long fibers and 50% short fibers. In one embodiment, the hemp composition comprises between about 30% to about 50% long fibers and about 30% to about 50% short fibers. In one embodiment, the long hemp fibers are micronized fibers of a uniform or substantially uniform length. In one embodiment, the short hemp fibers are micronized fibers of a uniform or substantially uniform length. In one embodiment, the uniform or substantially uniform length of the long fibers is greater than the uniform or substantially uniform length of the short fibers. In one embodiment, the average length of the long fibers is greater than the average length of the short fibers. In one embodiment, the short hemp fibers are about 1 mm-2.5 mm. In one embodiment, the short hemp fibers are about 0.5 mm-2 mm. In one embodiment, the short hemp fibers are about 0.5 mm-5 mm. In one embodiment, the short hemp fibers of the hemp fiber composition are about 2 mm. In one embodiment, the long hemp fibers are about 5 mm-20 mm. In one embodiment, the long hemp fibers are about 5 mm-15 mm. In one embodiment, the long hemp fibers are about 5 mm-12 mm. In one embodiment, the long hemp fibers of the hemp fiber composition are about 10 mm. For avoidance of doubt, the term "about" as used herein to describe fiber length indicates a margin of error of 2 mm.

In one embodiment, the hemp composition of the present invention includes hemp shive which has been pulverized to a size of about 13 μm in length. In one embodiment, the pulverized hemp shive (i.e., shive flour) is about 5 μm-25 μm in length. In one embodiment, the pulverized hemp shive is about 10 μm-20 μm in length. For avoidance of doubt, the term "about" as used herein to describe hemp shive size indicates a margin of error of 2 μm In one embodiment, the hemp composition of the present invention includes both micronized hemp fibers and pulverized hemp shive. In one embodiment, the hemp composition of the present invention comprises about 20-30% pulverized hemp shive and about 70-80% micronized hemp fiber (e.g., about 35% to 40% long hemp fibers and about 35% to 40% short hemp fibers). In one embodiment, the hemp composition of the present invention comprises about 15% pulverized hemp shive and about 85% pulverized hemp fiber. In one embodiment, the hemp composition comprises between about 30% to 50% long fibers, about 30% to 50% short fibers, and about 1% to 40% pulverized hemp shive. For avoidance of doubt, the term "about" as used with respect to percentages herein indicates a margin of error of 5%.

In one embodiment, the hemp composition of the present invention includes micronized hemp fibers and hemp dust generated during the processing of the hemp fiber. In one embodiment, the hemp composition of the present invention includes micronized hemp fibers, micronized hemp shive, and hemp dust generated during the processing of the hemp fiber.

One of ordinary skill in the art will appreciate that the process for creating the natural fiber composition of the present invention (i.e., the hemp composition) is operable to be used for a variety of natural fiber plants, and more particularly those natural fibers with significant genetic relativity to the industrial hemp plant (e.g., dicotyledonous plants from which bast fiber is operable to be derived). Examples of natural fiber plants operable to undergo the process of retting, decortication, micronization, and pulverizing as disclosed herein include but are not limited to flax, jute, ramie, abaca, cantala, henequen, sisal, mitsumata, gampi, and kozo. In one embodiment, the ratio of micronized long fibers to micronized short fibers of such bast plants and fibers falls within the range specified with regard to the hemp composition of the present invention. In one embodiment, the composition of a natural bast fiber plant includes the components disclosed herein with respect to hemp (i.e., for a jute composition, the jute shive is pulverized to produce pulverized jute shive, which is added to a jute composition together with long micronized jute fibers and short micronized jute fibers). In one embodiment, the components of a composition of a natural bast fiber plant fall within the range disclosed herein with respect to the hemp composition.

For natural fiber compositions of sweetgrass, miscanthus, and other non-bast crops, no prior retting and/or decortication is required, as there is no shive or lignin to be removed from the plant. In one embodiment, non-bast natural fiber compositions according to the present invention are obtained through a process of micronizing a portion of the non-bast fiber to obtain the long and short fibers as disclosed herein. In one embodiment, non-bast natural fiber compositions according to the present invention are obtained through a process of pulverizing a portion of the non-bast fiber to obtain a pulverized component as disclosed herein. In one embodiment, the micronized non-bast fiber is weighed and combined with either pulverized non-bast fiber or pulverized bast shive. In one embodiment, the process of producing a natural fiber composition according to the present invention includes a dust removal step to remove any dust byproduct produced from the micronization, pulverizing, or combining of the components. In one embodiment, the natural fiber composition containing the non-bast fiber is homogenized with the pulverized component. In one embodiment, the long non-bast fibers and the short non-bast fibers are homogenized. In one embodiment, the homogenized non-bast fiber composition is extruded together with the pulverized component to produce the natural fiber composition of the present invention. In one embodiment, a composition including a non-bast plant component is produced using a twin-screw extruder to combine and homogenize the components while removing any dust byproduct. Examples of twin-screw extruders are disclosed in U.S. Pat. Nos. 4,824,256; 5,000,900; 5,044,757; 5,728,337; 6,682,213; 8,827,539; and 9,102,091, each of which is incorporated herein by reference in its entirety.

In one embodiment, the natural fiber composition of the present invention is wood pulp. In one embodiment, the natural fiber composition of the present invention comprises wood pulp. In one embodiment, the wood pulp of the present invention comprises hardwood fibers. In one embodiment, the wood pulp of the present invention comprises softwood fibers (e.g., birch). In one embodiment, the natural fiber composition of the present invention comprises both hardwood fibers and softwood fibers. The addition of a wood cellulose composition is advantageous for fiber binding, as wood cellulose contains hemi-cellulose which allows for the binding of fibers during the product formation process. Hemp fibers lack hemi-cellulose, requiring the extensive mechanical processing (i.e. chopping, milling, shredding) described herein in order to bind hemp fibers. The extensive processing produces a non-hemi-cellulosic fiber which mimics the characteristics of hemi-cellulosic fibers to achieve a binding effect using hemp fiber. In one embodiment, the wood pulp fibers are about 0.5 mm-1.5 mm. In one embodiment, the wood pulp fibers are about 0.5 mm-2.5 mm. In one embodiment, the wood pulp fibers are about 0.5 mm-5 mm. In one embodiment, the wood pulp fibers are about 5 mm-20 mm. In one embodiment, the wood pulp fibers are the same length as the short, micronized hemp fibers. In one embodiment, the wood pulp fibers are the same length as the long micronized hemp fibers.

In one embodiment, the natural fiber composition of the present invention is a combination of the hemp fiber composition disclosed herein and one or more additional compositions (e.g., wood cellulose). In one embodiment, the natural fiber composition of the present invention is a combination of the hemp composition, sweetgrass, and wood cellulose. By way of example, and not limitation, the ratio of the hemp composition (or other composition derived from a bast fiber plant or non-bast fiber plant) to the additional composition (e.g., wood cellulose, sweet grass) is 1:1, 1:2, 1:3, 1:4, 1:5, 2:1, 2:3, 2:5, 3:1, 3:2, 3:4, 3:5, 4:1, 4:3, 4:5, 5:1, 5:2, 5:3, or 5:4. In one embodiment, the natural fiber composition of the present invention comprises about 50% hemp fiber composition and 50% wood cellulose composition. In one embodiment, the hemp composition comprises between about 40% to about 60% hemp fiber composition and about 40% to about 60% wood cellulose composition. In one embodiment, the natural fiber composition of the present invention is a combination of the hemp composition and wood cellulose. In one embodiment, the natural fiber composition is 45-55% hemp composition and 45-55% wood cellulose. In one embodiment, the natural fiber composition is about 50% hemp composition and about 50% wood cellulose. In one embodiment, the natural fiber composition is 75-85% hemp composition and 15-25% wood cellulose. In one embodiment, the natural fiber composition is about 80% hemp composition and about 20% wood cellulose. In one embodiment, the hemp fiber composition of the present invention is bleached and turned into paper before being incorporated into the composition of the present invention.

Once the natural fiber composition of the present invention has been obtained (i.e., prepared or combined), the natural fibers are mixed with a liquid to form a three-dimensional pulp slurry. In one embodiment, the pulp slurry mixture is about 5% natural fiber composition and about 95% liquid. In one embodiment, the liquid is water. In one embodiment, the liquid is enhanced with one or more additives to achieve particular properties in the end-product (e.g., increased hydrophobic effect). Examples of additives include but are not limited to alkylated ketene dimers (AKD), lime, and organic starch. In one embodiment, bleach is added to the slurry mixture to normalize the color of the resulting product. In one embodiment, the pulp slurry does not contain any additives. The term additive as used herein refers to property enhancement agents which affect the properties of a product resulting from the slurry. Additives include water-proofing agents, oil-proofing agents, sizing agents, fillers, binding agents, and stabilizing agents. In one embodiment, the process of the present invention produces a product which does not require quality enhancement in the slurry formulation stage and thus does not include any additives. In one embodiment, no water-proofing agents, oil-proofing agents, sizing agents, fillers, binding agents, and/or stabilizing agents are added to the pulp slurry.

Figure 2A:
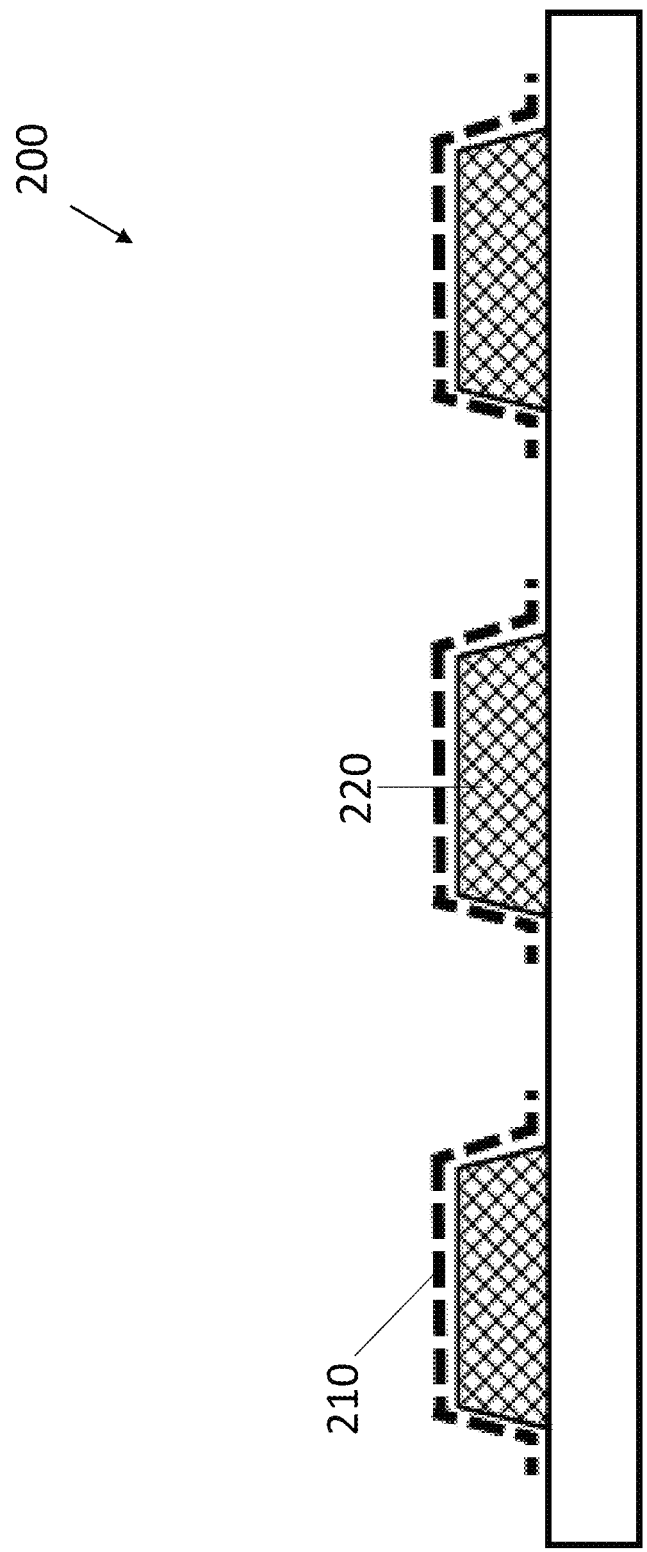
FIG. 2A is a schematic diagram illustrating a first molding step.
Figure 2B:
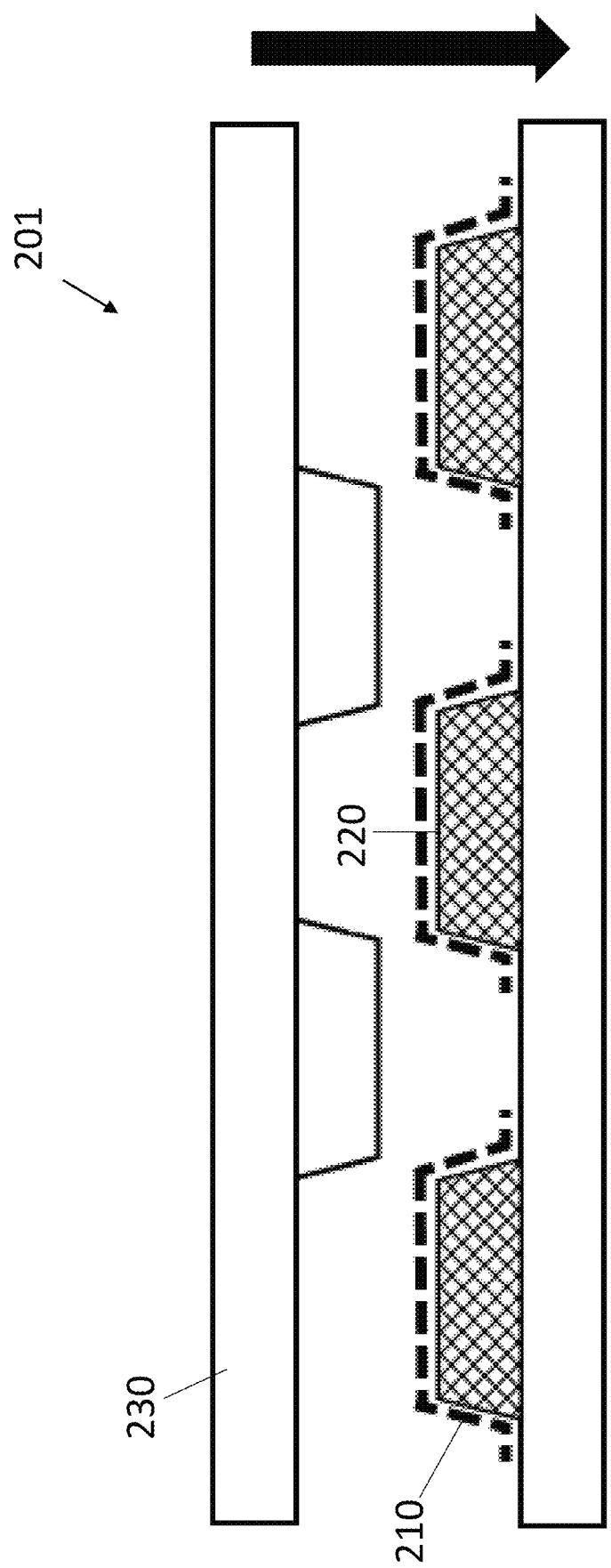
FIG. 2B is a schematic diagram illustrating a second molding step.
Figure 2C:
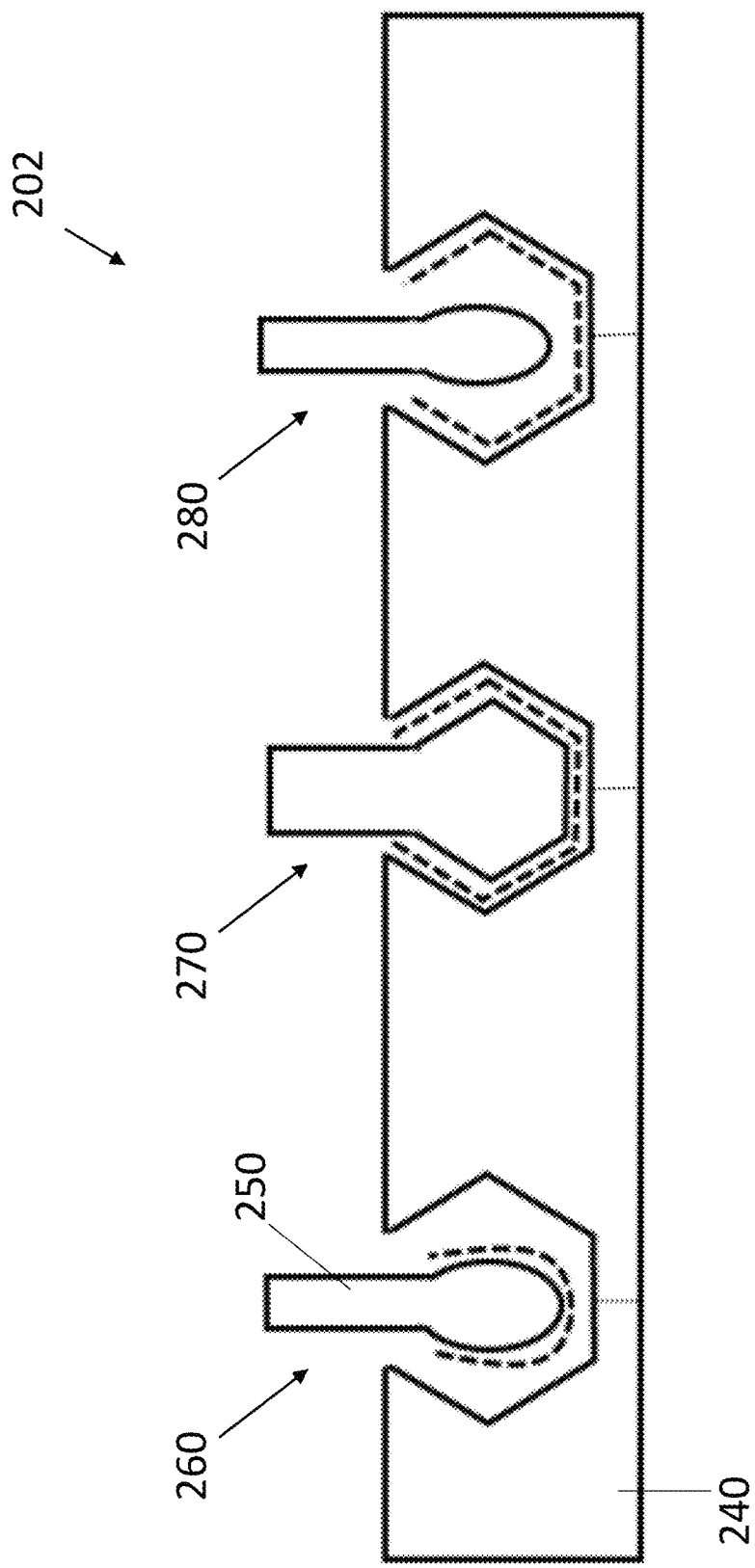
FIG. 2C is a schematic diagram illustrating a third molding step.

The pulp slurry of the present invention is then applied to a mold. One of ordinary skill in the art will appreciate that there are many molding processes available for producing three-dimensional molded forms. FIGS. 2A-2C depict a molding process according to one embodiment of the present invention wherein the pulp slurry 210 is applied to the mesh mold 220 or the mold cast 240. In one embodiment, once the pulp has been molded into a 3D shape, the 3D shape is transferred to the drying conveyor using a transfer tool and dried in a drying tunnel (i.e., hot air is applied to the 3D shape to produce a dried product). In one embodiment, the temperature of the air used to dry the molded product is about 100 degrees to about 150 degrees Celsius. In one embodiment, the pulp is applied to a mold which has been preheated and pressed into a 3D shape, which dries the product directly in the mold. In one embodiment, the pulp is applied to a mold and pressed into a 3D shape using a heated press, which dries the product directly in the mold. In one embodiment, the preheated mold and/or the heated press is between about 190 degrees to 210 degrees Celsius.

Drying is a flexible process, as the design of the 3D shape (e.g., wall thickness, surface area) and the raw material composition (e.g., wood cellulose components, composition ratios of fiber to pulverized particles, and hemp fibers) have a direct impact on the time required to dry the 3D shape. In one embodiment, the molded product is dried in a drying tunnel at a temperature between 100-150 degrees Celsius. In one embodiment, the speed of the conveyor is configured to be calibrated according to the drying time required by the design and composition of the 3D shape in order to enable the complete elimination of the moisture from the pulp slurry.

FIG. 2A depicts a vacuum molding process 200 according to one embodiment of the present invention. The pulp slurry 210 is applied to the mesh mold 220. Negative pressure is then used to vacuum the pulp slurry 210 to the mesh mold 220. As negative pressure is applied to the pulp slurry 210, the pulp slurry 210 conforms to the shape of the mesh mold 220.

In one embodiment, the pulp slurry is sprayed or poured onto the mold. In one embodiment, the mold is submerged into the pulp slurry of the present invention. Negative pressure is applied to the submerged mold as disclosed herein to suction a portion of the natural fiber composition to the surface of the mold, forming a 3D shape on the mold. The mold is then retracted from the slurry. In one embodiment, the 3D shape is released (e.g., negative pressurization is ceased) onto a conveyor belt which carries the 3D shape into a drying tunnel as disclosed herein. In one embodiment, the 3D shape is released (e.g., the molded shape is removed using a transfer tool) onto a second tooling set, which has been preheated as disclosed herein. The 3D shape is pressed by the heated tooling (i.e., heated mold and/or heated press) and the moisture is evaporated to achieve a dried product. The 3D shape gains its stiffness during the drying process as moisture is removed (i.e., evaporated from the 3D shape), producing a dried, 3D product. In one embodiment, the dried product is pressed using a pressing tool. In one embodiment, the pressing tool applies between about 70 to about 100 tons of compressive force to the dried product to achieve a smooth surface and/or apply decorative effects such as embossing or a particular structural feature.

In one embodiment, the molded product is operable to be dried without removing the product from the mold. In one embodiment, the molded product is dried in a drying tunnel at a temperature between 100-150 degrees Celsius.

FIG. 2B depicts a thermoforming process 201 according to one embodiment of the present invention. The pulp slurry 210 is applied to the mesh mold 220. A heat press 230 then applies positive pressure to the pulp slurry 210, forcing the pulp slurry 210 to take the shape of the mesh mold 220. The moisture is evaporated to achieve a dried product. One of ordinary skill in the art will appreciate that the depictions of these processes herein are for understanding of the present invention and are not intended to depict detailed products which are operable to be molded from complex forms.

FIG. 2C depicts an air-burst molding process 202 according to one embodiment of the present invention. The pulp slurry 210 is applied to a contractable parison 250, which is then inserted into the mold cast 240 as depicted at step 260. Positive airflow is directed into the contractable parison 250 to expand the contractable parison 250, forcing the pulp slurry to conform to the shape of the mold cast 240 as depicted in step 270. The positive airflow is then stopped, causing the contractable parison 250 to contract as depicted at step 280, separating from the pulp slurry 210 which has been pressed into the mold cast 240. The mold cast 240 is then operable to separate in order to remove the molded form from the mold cast 240.

In one embodiment, the air-burst molding process of the present invention uses a parison-like tool to apply pressure to the pulp slurry within a mold cast. However, one of ordinary skill in the art will appreciate that the air-burst molding process differs from traditional blow molding processes. Specifically, the contractable parison of the present process differs from the parisons used in such processes, as traditional parisons are comprised of the material intended to be molded. Therefore, traditional parisons are not intended to contract after expanding. However, the present invention utilizes a parison-like (i.e., balloon-like) transfer tool to apply pressure to the pulp slurry within the mold cast. After the product is formed, the contractable parison contracts and returns to a first, pre-expansion shape. In one embodiment, the mold tooling is submerged into the pulp slurry of the present invention. Once the tool emerges from the slurry, a parison is inserted into the tool opening and expanded using positive air flow. After obtaining sufficient pressure on the inner walls of the 3D shape, the parison collapses and removes itself from the tool. The tool is then opened in half and the 3D shape is then dried to produce a dried product.

Figure 3:
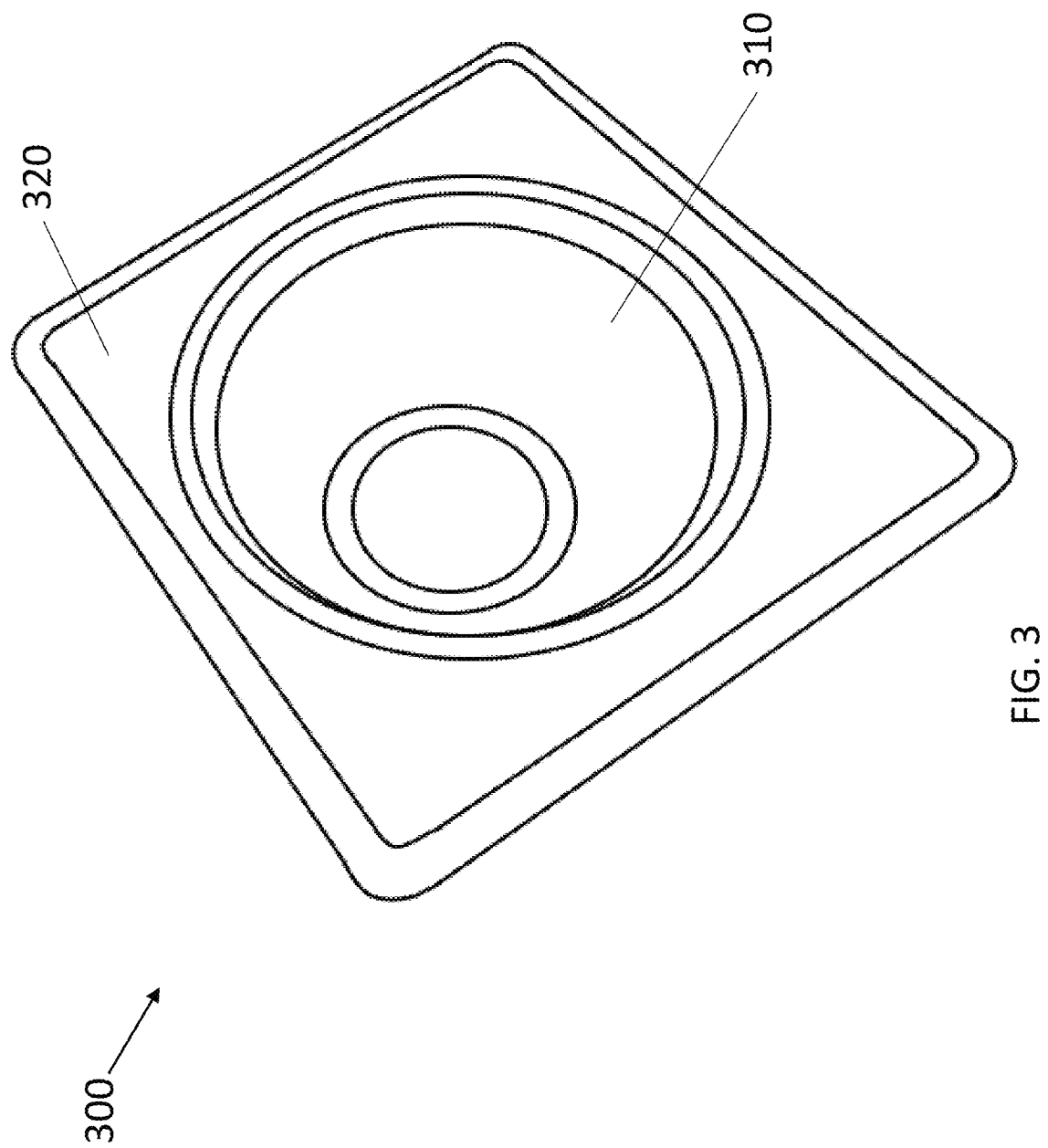
FIG. 3 illustrates a perspective view of a molded product of the present invention with excess surface area.

FIG. 3 depicts a product with excess surface according to one embodiment of the present invention. The product 300 resulting from a molding process of the present invention (i.e., a vacuum molding or thermoforming process) includes the desired molded form 310 as well as excess surface 320 resulting from the pressing of the pulp slurry which is not in a mold or cast. The pulp slurry is pressed flat, forming the excess surface 320 depicted herein.

In one embodiment, the excess surface is removed after the product is formed. In one embodiment, the amount of pulp slurry applied to the mold or cast of the present invention is measured prior to application to ensure excess pulp slurry is not applied and therefore no excess surface is formed during molding. In one embodiment, the excess surface is part of the desired product. For example, for objects which packaging in a product of the present invention and placed in boxes before transportation and distribution, the excess surface may be calculated to fit within the box such that the edge of the excess surface contacts the walls of the box and prevents the movement of the packaged object within the box. In one embodiment, excess surface is removed through a die cutting process. In one embodiment, a die cutting process is performed simultaneously in a pressing step (e.g., the pressing tool is equipped with a razor to remove excess surface while pressing). In one embodiment, the 3D shapes are conveyed to a die cutting station after the product has been drying in a drying tunnel and/or pressed using heated tooling. The excess surface of the dried product is then removed by a sharp edge.

Figure 4A:
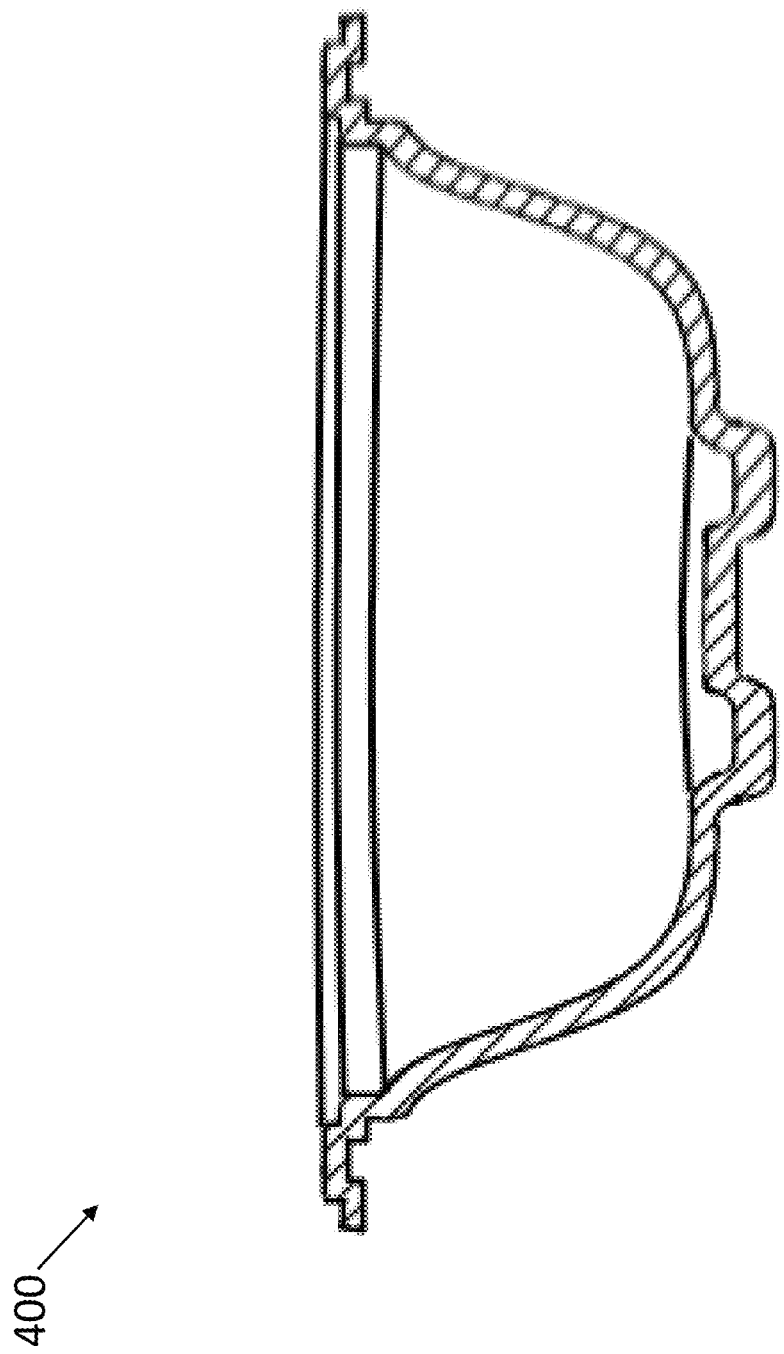
FIG. 4A illustrates a molded product according to one embodiment of the present invention.
Figure 4B:
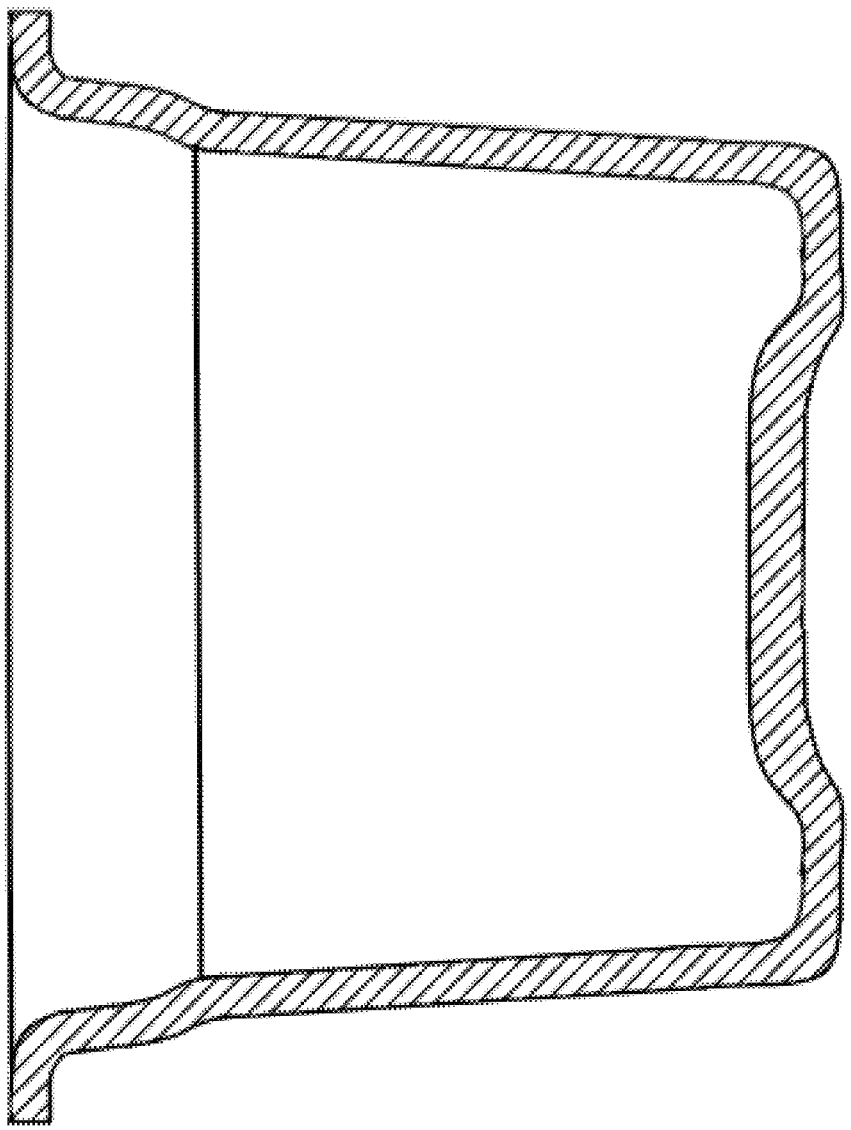
FIG. 4B illustrates a molded product according to one embodiment of the present invention.
Figure 4C:
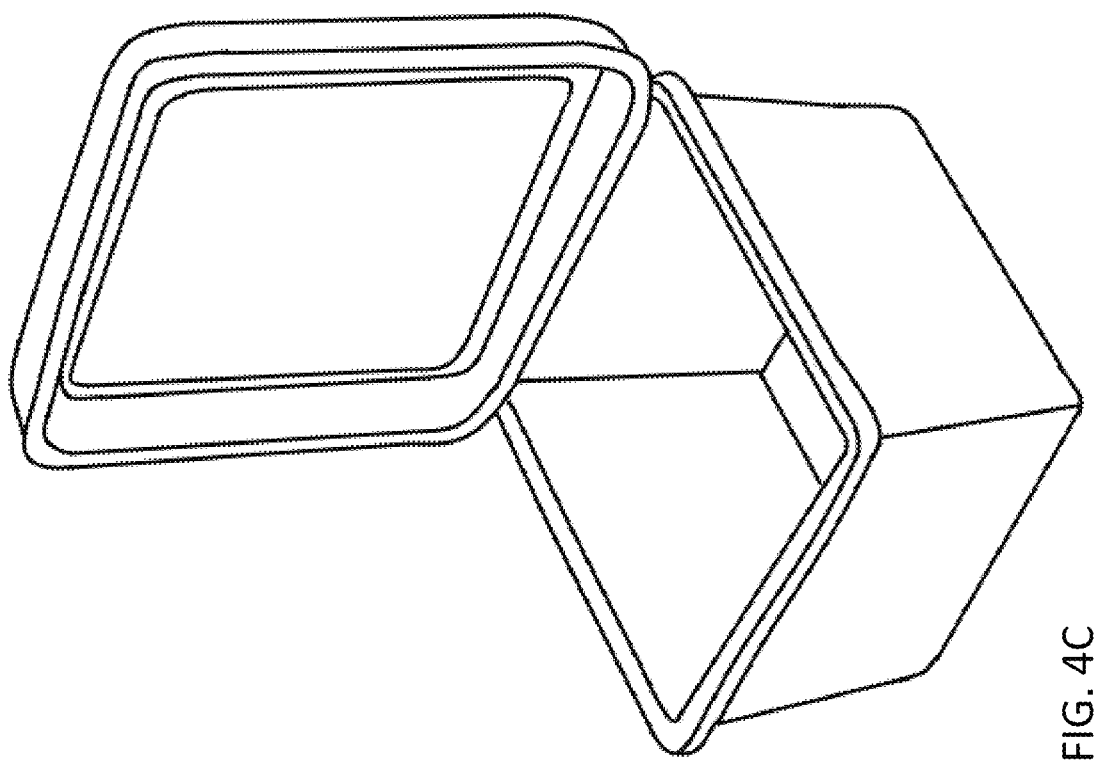
FIG. 4C illustrates a molded product according to one embodiment of the present invention.

FIGS. 4A-4C are molded products according to one embodiment of the present invention. The cup 400, the coffee pod 401, and the planter box 402 are exemplary illustrations of products where operable to be formed from the process of the present invention. However, one of ordinary skill in the art will appreciate that the molds of the present invention are operable to form complex shapes with non-linear surfaces.

In one embodiment, the molded product of the present invention is coated to provide durability and create a moisture barrier between the product and the contents that are packaged using the product of the present invention. In one embodiment, the molded product is coated only along the internal surface of the present invention. In one embodiment, the molded product is entirely coated on both the interior surface and exterior surface of the product. In one embodiment of the present invention, the coating is fully biodegradable. In one embodiment, the coating process includes coating a product with a first coating formulation and a second coating formulation, forming distinct layers of biodegradable coating. In one embodiment, the coating process includes the formulation and method disclosed in US Patent Pub. No. 2022/0259805, which is incorporated herein by reference in its entirety.

In one embodiment, the natural fiber composition is consistent throughout the molded product. In one embodiment, a molded product resulting from the process disclosed herein does not include layers comprising distinct natural fiber types for each layer. In one embodiment, the product formed according to the present invention is more durable compared to other products formed solely from wood cellulose (e.g., higher tensile strength, increased water resistance).

Figure 5:
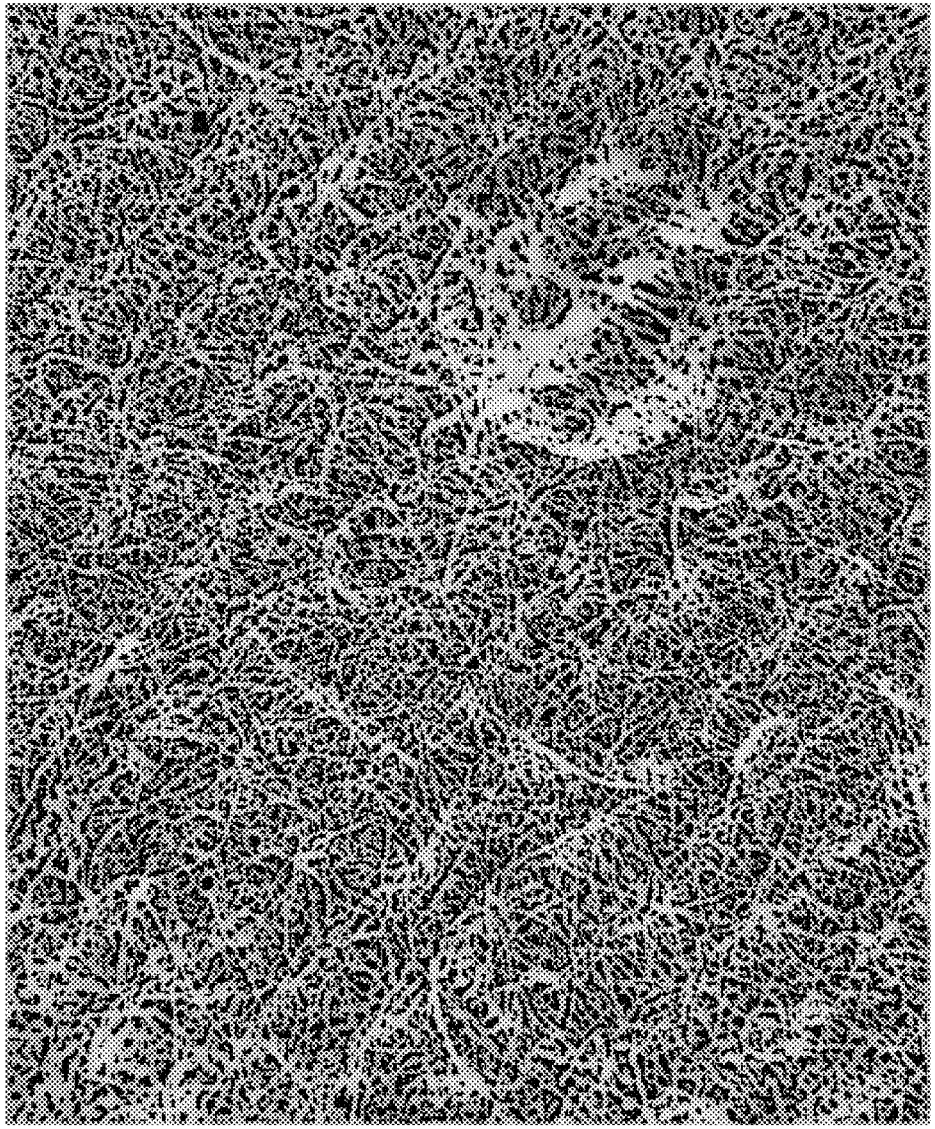
FIG. 5 is a detailed view of the surface of a molded product according to one embodiment of the present invention.

FIG. 5 is a detailed view of the surface of a molded product according to one embodiment of the present invention. The natural fiber composition forms a dense, fibrous matrix which is visible on the surface of the molded product. The fibers vary in length, creating a matrix which prevents the collapse of the molded product and increases the strength of products made using the fiber matrix. In one embodiment, the natural fibers of the product are visible to the naked eye. In one embodiment, the natural fibers of the product are not visible to the naked eye after the molded product has been pressed after drying.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A biodegradable product, comprising:
a matrix of natural fibers formed from a pulp slurry;
wherein the natural fibers are comprised of mechanically micronized hemp fibers and pulverized hemp shive.

2. The biodegradable product of claim 1, wherein the pulp slurry does not contain an additive.

3. The biodegradable product of claim 1, wherein the pulp slurry is comprised of about 95% water.

4. The biodegradable product of claim 1, wherein the mechanically micronized hemp fibers include long fibers and short fibers, wherein a composition of the natural fibers is about 30% to 50% long fibers, about 30% to 50% short fibers, and about 1% to 40% pulverized hemp shive.

5. The biodegradable product of claim 1, wherein the pulp slurry includes bleach to normalize a color of the biodegradable product.

6. The biodegradable product of claim 1, wherein the pulp slurry is applied to a mold, wherein the mold is preheated, and wherein the preheated mold is between about 190 degrees to 210 degrees Celsius.

7. The biodegradable product of claim 6, wherein a three-dimensional object is created after the pulp slurry is dried directly in a mold, wherein the three-dimensional object is operable to be coated with a first coating formulation and a second coating formulation, wherein a resultant coat is comprised of distinct layers of biodegradable coating.

8. The biodegradable product of claim 1, wherein the matrix of natural fibers is visible on a surface of the biodegradable product.

9. A biodegradable product, comprising:
an object molded from a pulp slurry of natural fibers;
wherein the natural fibers are comprised of a mixture of mechanically micronized hemp fibers and pulverized hemp shive; and
wherein the mechanically micronized hemp fibers include long fibers and short fibers.

10. The biodegradable product of claim 9, further comprising a lid, wherein the lid is attached to at least one of a plurality of sides of the object.

11. The biodegradable product of claim 9, wherein the natural fibers are comprised of about 80% hemp and about 20% wood cellulose.

12. The biodegradable product of claim 9, wherein a ratio of the long fibers to the short fibers is approximately 1:1.

13. The biodegradable product of claim 9, wherein the short fibers are about 1 mm to about 2.5 mm in length.

14. The biodegradable product of claim 9, wherein the mixture of mechanically micronized hemp fibers and pulverized hemp shive comprises about 85% mechanically micronized hemp fibers and about 15% pulverized hemp shive.

15. The biodegradable product of claim 9, wherein an interior surface of a plurality of sides of the object is coated with a biodegradable coating mixture, wherein the coating creates a moisture barrier.

16. The biodegradable product of claim 9, wherein the pulverized hemp shive is about 10 μm to about 20 μm in length.

17. A biodegradable product, comprising:
an object molded from a pulp slurry of natural fibers; and
a coating;
wherein the natural fibers are comprised of mechanically micronized hemp fibers and pulverized hemp shive.

18. The biodegradable product of claim 17, wherein the coating is applied to a plurality of interior surfaces and a plurality of exterior surfaces of the object.

19. The biodegradable product of claim 17, wherein the pulverized hemp shive is about 20-30% of a composition of the natural fibers.

20. The biodegradable product of claim 17, wherein the object is dried in a drying tunnel at a temperature between 100 to 150 degrees Celsius.

* * * * *